United States Patent [19]

Chu et al.

[11] Patent Number: 5,275,886
[45] Date of Patent: Jan. 4, 1994

[54] POLYPROPYLENE FILM

[75] Inventors: Shaw-Chang Chu, Cranbury, N.J.; Kevin A. Kirk, Macedon, N.Y.

[73] Assignee: Mobil Oil Corporation, Fairfax, Va.

[21] Appl. No.: 957,848

[22] Filed: Oct. 8, 1992

[51] Int. Cl.$^5$ ............................................. B32B 27/00
[52] U.S. Cl. .................................... 428/421; 428/461; 428/487; 428/511; 428/910; 428/516
[58] Field of Search ............... 428/487, 421, 516, 910, 428/461, 511

[56] References Cited

U.S. PATENT DOCUMENTS

| | | | |
|---|---|---|---|
| 3,176,021 | 3/1965 | Volungis et al. | 260/32.6 |
| 3,753,769 | 8/1973 | Steiner | 117/122 H |
| 4,225,644 | 9/1980 | Tsuchiya et al. | 428/215 |
| 4,302,506 | 11/1981 | Heberger | 428/341 |
| 4,419,410 | 12/1983 | Weiner | 428/516 |
| 4,419,411 | 12/1983 | Park | 428/516 |
| 4,486,483 | 12/1984 | Caines | 428/195 |
| 4,533,509 | 8/1985 | Gust et al. | 264/171 |
| 4,578,316 | 3/1986 | Clauson et al. | 428/516 |
| 4,618,527 | 10/1986 | Doyen | 428/213 |
| 4,956,233 | 9/1990 | Chu et al. | 428/349 |

OTHER PUBLICATIONS

Allowed Mobil applications Ser. No. 07/772,646, filed Oct. 9, 1991, and Ser. No. 07/676,020, filed Mar. 27, 1991, and copending application Ser. No. 813,168, filed Dec. 24, 1991.

Primary Examiner—Edith Buffalow
Attorney, Agent, or Firm—Alexander J. McKillop; Malcolm D. Keen; Marina V. Schneller

[57] ABSTRACT

A thermoplastic film structure comprising a base layer of a thermoplastic resin which comprises polypropylene and a coating layer of a polyvinylidene fluoride is disclosed. The film is characterized by reduced coefficient of friction, improved anti-blocking characteristics, and enhanced oxygen and water vapor barrier properties. The disclosure also provides a process for making the film in which the polypropylene-containing thermoplastic resin is extruded into a sheet, said sheet oriented in the longitudinal direction to form a monoaxially oriented film, said film coated with the polyvinylidene fluoride and said coated film oriented in the transverse direction.

11 Claims, No Drawings

POLYPROPYLENE FILM

BACKGROUND OF THE INVENTION

Polypropylene films have found wide acceptance in the packaging industry, especially as a food packaging agent, because of their superior physical properties. Polypropylene film, usually biaxially oriented, is characterized by high tensile modulus and stiffness, and excellent optical clarity and a certain degree of moisture resistance. However, polypropylene film is highly pervious to gases and air. Moreover, polypropylene possesses one major disadvantageous property, high inherent coefficient of friction (COF).

High COF complicates the processing of polypropylene film. Polypropylene film processing is impeded by poor transport, caused by its high COF, over rollers, guides and the like. In addition, high COF created film storage problems. Because of its high COF one layer of polypropylene film sticks to those above and beneath it, creating the problem commonly referred to as blocking.

This serious disadvantage of polypropylene film is well known to those skilled in the art. Thus, many proposed solutions to overcome this major deficiency have been proposed in the art. One such proposal has been to incorporate additives in the polypropylene resin processed to form the film. A favorite additive suggested in the art is fatty acid amides. These amides decrease the film's COF as they migrate to the film surface after heat treatment and aging.

Although this method has been used, actual COF is a function of the heat history to which the film has been exposed during shipping, storage and processing. As such, it is subject to wide variation. More significantly, the presence of fatty acid amides on the film surface oftentimes adversely affects the appearance of the film as manifested by decreased gloss and the presence of streaks. Another serious disadvantage of using fatty acid amides is the detrimental effect of fatty acid amides on polypropylene film surface wettability and adhesion. This adverse characteristic applies to coating, inks, adhesives and the like, especially in water based forms.

It is also known to coat polypropylene film with certain fatty acid amides to impart lubricating and anti-blocking characteristics, as taught in U.S. Pat. No. 4,255,644. However, the application of such coatings by the film manufacturer is not particularly attractive because of the requirement that they be applied as solutions in organic solvents. Health and safety factors dictate against the in-plant utilization of organic solvents in coating processes undertaken during the film manufacture.

Other slip additives have been suggested to overcome the inherent problem of high COF in thermoplastic films. One such solution, as disclosed by U.S. Pat. No. 4,302,506, is the use of a latex coating containing stearamidopropyl- dimethyl-beta-hydroxyethylammonium nitrate and a crosslinkable acrylic copolymer. This coating has been advanced for use on polyester films.

Although this coating is alleged to improve slip properties without adversely affecting clarity in polyester films it is unnecessary to determine whether this coating would provide the same improved result on polypropylene film. It is known that such a coating is not in conformity with the requirements and regulations of the U.S. Food and Drug Administration for use in films which contact foods. As such a critical market for polypropylene films, as a food packaging agent, could not be exploited if such a material was added to polypropylene-containing film.

Yet another suggestion advanced in the prior art to reduce the blocking characteristic of polypropylene film is to add a finely divided inorganic material as a surface modifier. Such a modification not only provides a non-blocking surface having improved slip characteristics but is also independent of the heat history of the film. Moreover, the addition of such a surface modifier does not create the adverse optical and wettability effects associated with amide-modified films.

However, like the other proposed solutions, this proposed means of alleviating high COF creates new problems. Oftentimes, polypropylene film is laminated to other films. For example, glassine paper is commonly laminated to polypropylene film. Such a laminate, when provided as a thin surface layer containing finely divided inorganic material, exhibits significantly higher COF values than does the unlaminated polypropylene film. Such laminates are known to perform marginally at best on conventional form, fill and seal machines.

The above discussion reflects the need in the art for a new and improved polypropylene film characterized by improved anti-blocking characteristics and decreased COF. However, it is incumbent that the improvement in film slip property not correspond to the decline in other properties, typical of the solutions advanced in the prior art.

SUMMARY OF THE INVENTION

The present invention provides a polypropylene film having reduced COF and good non-blocking characteristics compared to unmodified polypropylene films. This film is furthermore characterized by a coefficient of friction independent of its previous heat history. The polypropylene film of the present invention is not adversely affected by diminished wettability and adhesion of inks, coatings and adhesives, whether water or solvent based. Finally, the subject polypropylene film of this invention maintains its decreased COF characteristics even when laminated to other films such as glassine papers.

In accordance with the present invention, a biaxially oriented polypropylene film is provided. The film includes a base layer of a thermoplastic resin which includes polypropylene and a coating of a polyvinylidene fluoride resin. In further accordance with the present invention a process for preparing a thermoplastic film is taught. In this process a thermoplastic resin which includes polypropylene is extruded into a sheet. The film is oriented in the longitudinal direction. The polyvinylidene fluoride is coated onto said longitudinally oriented film. Preferably, the coated film is oriented in the transverse direction to form the final biaxially oriented film structure, after coating.

DETAILED DESCRIPTION

The thermoplastic film of the invention comprises a base layer of a thermoplastic resin, which resin comprises polypropylene, upon which is disposed a coating layer of a polyvinylidene fluoride. The base layer, a relatively thick layer of the thermoplastic resin, is, as stated above, a resin which comprises polypropylene. That is, the base layer may be a polypropylene homopolymer, a blend of a polypropylene homopolymer and another olefinic polymer, a co-extrusion of a polypropylene homopolymer and another olefinic polymer and the like. Additionally, the base thermoplastic film may be a blend of a polypropylene homopolymer and void-initiating solid particles or polymers as taught in U.S. Pat. No. 4,377,616 and U.S. Pat. No. 4,632,869.

The second layer of the polypropylene film, the coating layer, is a coating layer of a polyvinylidene fluoride resin in a sufficient amount to decrease the COF of the polypropylene film layer. In addition to decreased COF values, the ultimate product of the invention exhibits decreased oxygen transmission and water vapor (moisture) transmission rates. Polyvinylidene fluoride polymers are well known in the art. KIRK OTHMER ENCYCLOPEDIA OF CHEMICAL TECHNOLOGY, Vol. 11 page 64 et seq (Third Ed.).

In another aspect of the present invention the above-described coated film may be part of a composite film wherein the coated film is laminated onto or supported by another film ply which may be a plastic, paper or metallic film. In a particularly preferred embodiment, the composite film of the present invention is a laminate of the coated film of the present invention and a glassine film. Conventionally, glassine paper use is for packaging, dust covers for books and general household purposes. Glassine is a thin transparent, and very flexible paper obtained by excessive beating of the pulp; it may contain an admixture of urea-formaldehyde to improve strength.

The above discussed coated polypropylene-containing film is formed in a process wherein a polypropylene thermoplastic resin, which comprises the relatively thick polypropylene base layer, is melted and extruded through a slit die. The molten polypropylene-containing thermoplastic is cooled to form a solid sheet which is oriented in the longitudinal direction. The coating is applied to the longitudinally oriented film. The film is thereafter oriented in the transverse direction to form a biaxially oriented coated film.

In a preferred embodiment of this process the molten polypropylene-containing thermoplastic film is initially extruded through a die and cast onto a cooling drum wherein it is quenched to form a solid sheet. In a still more preferred embodiment, the quenching of the thermoplastic melt on the cooling drum is followed by re-heating of the sheet prior to orienting in the longitudinal direction.

The step of orienting the thermoplastic sheet in the longitudinal direction is, in a preferred embodiment, provided by longitudinal direction stretching. Preferably, stretching in the longitudinal direction involves longitudinal stretching such that the film is increased from about 2.5 times to about 8 times its original length. More preferably, the film is increased from about 4 times to about 6 times its original length. Prior to longitudinal orientation, the film has a thickness ranging from 20 to 40 mils.

In a further preferred embodiment of the present invention the longitudinally stretched film, prior to the application of the coating layer, is surface treated to improve surface wettability. Preferably, this surface treatment is provided by corona treatment or flame treatment. In a particularly preferred embodiment of this surface treatment step the surface that is subsequently coated is corona treated.

In a preferred embodiment of the subsequent step, the step of coating the surface, that step is provided by gravure coating. The gravure coating step, in this preferred embodiment, is conducted by utilizing a two-roll gravure coater. Other coating methods known in the art, for example, spray coating, may be substituted for the preferred use of gravure coating.

After completion of the coating operation, the film is preferably subjected to heating to accelerate drying of the coating which, as is discussed below, is applied in an aqueous form. Drying involves exposure of the film to elevated temperature. Depending upon the temperature employed in drying the coated monoaxially oriented film, the film may or may not be cooled or heated to obtain optimum temperature conditions during the next step, transverse orientation.

In the final essential step, the longitudinally oriented, coated film is oriented in the transverse direction. Preferably, orientation in the transverse direction is accomplished by transverse stretching. In the preferred embodiment wherein stretching is utilized to orient the film in the transverse direction, the film is stretched from about 6 to about 10 times its original width. More preferably, the longitudinally oriented films is stretched from about 7 to about 9 times its prestretched width.

In a preferred embodiment of this process, the film is annealed following transverse direction orientation. Annealing of the biaxially oriented film involves exposure of the film to elevated temperature. As in all heating steps, preferred temperatures are a function of the identity and constituency of the polypropylene-containing thermoplastic resin constituting the film.

In yet a further step included in a preferred embodiment of this invention, the uncoated surface of the biaxially oriented coated film is treated to improve its wettability and adhesion. Such treatment permits printing thereupon or the application of an adhesive followed by the application of another film ply to produce a laminate structure. In a preferred embodiment this surface treatment step is provided by corona treatment.

The coating layer, as stated above, is applied to the longitudinally oriented film. In a preferred embodiment, the coating is applied as an emulsion or latex composition. Preferably, the vehicle for the polyvinylidene fluoride is water. The use of water as the vehicle minimizes cost while, at the same time, optimizing safety and minimizing environmental concerns. Those skilled in the art are aware that organic solvents create the possibility of explosion, fire and environmental problems. These concerns are eliminated by the use of water as the solvent.

In a preferred embodiment, wherein an aqueous emulsion of the polyvinylidene fluoride is utilized, the concentration of the polymer is in the range of between about 5% by weight and about 20% by weight. In all of these recitations, the percent by weight of the polymer is based on the total weight of the latex emulsion.

The resulting coated film characteristics can be determined by standard procedures: coefficient of friction, as measured by ASTM Test Procedure D-1894; a blocking force reported in g/in; oxygen transmission rate, measured in cc/100 in$^2$/24 hr at 0% RH and 86° F.; and water vapor transmission rate, measured in gm/100 in$^2$/24 hr at 100% RH and 100° F.

The following examples are given to illustrate the scope of the present invention. Because these examples are given for illustrative purposes only, the invention should not be limited thereto.

EXAMPLE 1

An aqueous emulsion containing 17.2% by weight of poly(vinylidene fluoride) (Kynar 32 latex polymer, obtained from Pennwalt Corporation) was placed in a gravure coater which had been installed between the MD orienter and the TD orienter of a pilot scale film orienter. Polypropylene resin (Exxon 4252) was extruded through sheet die at 250° C., cast onto a cooling drum and quenched at 30° C. The sheet, measured about 30 mil thick, was reheated to 140° C. and stretched 5-fold in the MD, then corona-treated for improved surface wettability. When passing through the gravure coater, the MD oriented film web, now about 6 mil thick, was coated with the aqueous emulsion. The coated web was dried in pre-heat zones at 160° C., then stretched 8-fold in the TD at 145° C. and annealed at 160° C. The biaxially stretched film, measured 0.8 mil, was corona-treated on the uncoated side to improve the wettability and adhesion of ink and adhesives that might be applied later on. The resultant coated film had a COF of 0.23, a blocking force of 0.6 g/in., an oxygen transmission rate of 11 cc/100 in$^2$/24 hrs., and a water vapor transmission rate of 0.37 g/100 in$^2$/24 hrs. (vs. >0.5, >50, 180, and 0.48, respectively, for an unmodified polypropylene film).

To further illustrate the advantage of this invention, the above coated film and a commercial slip film (control) were each extrusion laminated by means of a low density polyethylene to a 1.6 mil thick glassine paper and then tested on Mira-Pak Miramatic Model L vertical form, fill and seal packaging machine. The results are shown in Table I.

TABLE 1

| Machinability of Supported Film | |
|---|---|
| Film Type | FOFC, lbs. |
| Example 1 | 20 |
| 75 LCM-W (control) | 30 |

For practical commercial packaging applications, the force over the forming collar (FOFC) should be less than 30 lbs. for a supported film. Otherwise, the film will risk machine downtime because of machine jamming and high squeal noise. The example 1 of this invention gave a FOFC value well below 30 lbs. and therefore it can be used satisfactorily on the packaging machinery with high reliability.

EXAMPLE 2

An aqueous emulsion containing 5.1% by weight of poly(vinylidene fluoride) was applied to polypropylene film in the same manner as described in Example 1. The resultant film had a COF of 0.34.

EXAMPLE 3

An aqueous emulsion containing 5.1% by weight of poly(vinylidene fluoride) was applied to a white opaque polypropylene film in the same manner as described in Example 1. The resultant film had a COF of 0.32.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the subject invention should be limited only by the appended claims.

What is claimed is:

1. A film composite comprising a laminate of glassine paper and a base layer comprising
    a film of a thermoplastic resin which is selected from the group consisting of a polypropylene homopolymer, a blend of a polypropylene homopolymer and another olefinic polymer, a co-extrusion of a polypropylene homopolymer and another olefinic polymer, a blend of polypropylene and void-initiating particles or polymers,
    and a coating layer of polyvinylidene fluoride on a surface of said base layer.

2. The film structure of claim 1 wherein said thermoplastic resin is selected from the group consisting of a polypropylene homopolymer and a co-extrusion of a polypropylene homopolymer and another olefinic polymer.

3. The film structure of claim 2 wherein said thermoplastic resin is selected from the group consisting of a polypropylene homopolymer and a co-extrusion of a polypropylene homopolymer and an ethylene-propylene copolymer.

4. The film structure of claim 3 wherein said thermoplastic resin is a polypropylene homopolymer.

5. The film structure of claim 1 wherein said base layer is longitudinally oriented.

6. The film structure of claim 5 wherein said coating layer is applied prior to subjecting the film to transverse orientation.

7. The film structure of claim 6 wherein said coating layer is applied as an emulsion.

8. The film structure of claim 6 wherein said base layer exhibits a coefficient of friction of 0.1-0.4 as measured by ASTM Test Procedure D-1984;

9. A thermoplastic film structure comprising a base layer of a polypropylene homopolymer having a first surface which is coated with a layer of polyvinylidene fluoride and a second surface which is uncoated and corona treated.

10. A film structure in accordance with claim 9 comprising at least one additional ply of a plastic, paper or metallic film disposed adjacent to said corona treated second surface.

11. A film structure in accordance with claim 10 wherein said additional ply is a glassine paper.

* * * * *